B. B. BRADLEY.
SPARE RIM HOLDER.
APPLICATION FILED OCT. 8, 1908.
941,341.
Patented Nov. 23, 1909.
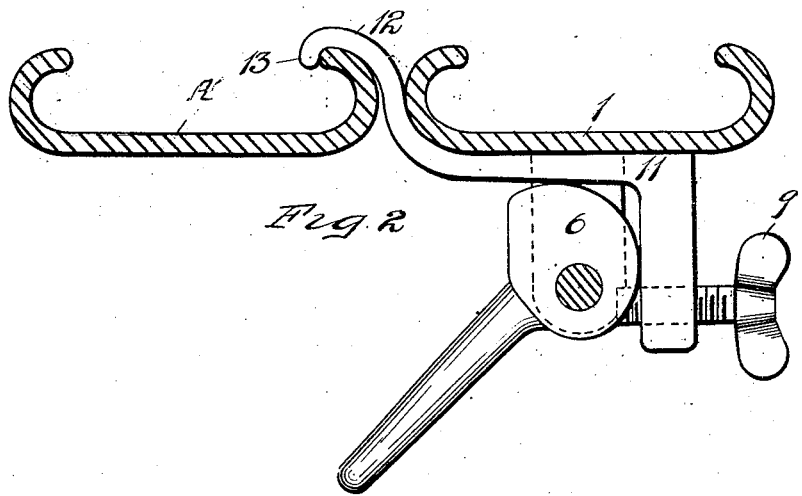
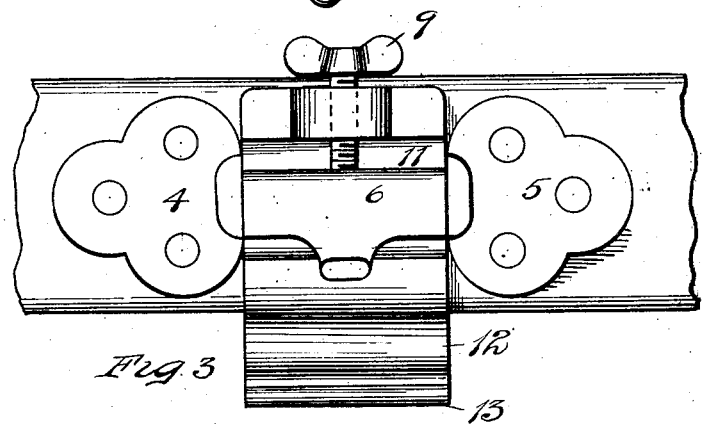
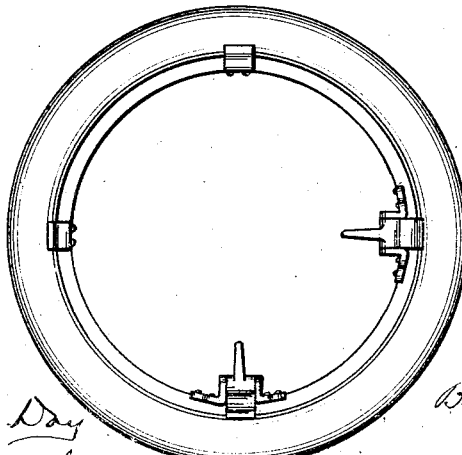
Witnesses
Clarence E. Day
Alecia Townsend
Inventor
Benjamin B. Bradley
By Parker T Burton
Attorneys

UNITED STATES PATENT OFFICE.

BENJAMIN B. BRADLEY, OF DETROIT, MICHIGAN, ASSIGNOR TO ISADORE C. FREUD, OF DETROIT, MICHIGAN.

SPARE-RIM HOLDER.

941,341.

Specification of Letters Patent.   Patented Nov. 23, 1909.

Application filed October 8, 1903.   Serial No. 456,762.

*To all whom it may concern:*

Be it known that I, BENJAMIN B. BRADLEY, a citizen of the United States, residing at Detroit, county of Wayne, State of Michigan, have invented a certain new and useful Improvement in Spare-Rim Holders, and declare the following to be a full, clear, and exact description of the same, such as will enable others skilled in the art to which it pertains to make and use the same, reference being had to the accompanying drawings, which form a part of this specification.

This invention relates to spare rim holders for automobiles; it has for its object an improved means of attaching an extra or auxiliary tire to the ordinary wheel rim, or tire seat, in cases when the ordinary inflated tire is punctured or injured to such an extent that it cannot be used.

In the drawings:—Figure 1, is an elevation of the assembled wheel. Fig. 2, is a cross section of the wheel attaching clamp. Fig. 3, is a plan of the wheel attaching clamp.

The tire seat 1 is similar in shape and form to the ordinary tire seat. It is held in relation to the ordinary tire seat A by means of four clamps or hooks, at least two of which are adjustable hooks each being provided with a body part 11, adapted to engage closely against the inside of the rim 1, and with a goose-neck 12, and a bill 13, adapted to hook over the edge of the regular tire seat, as represented in Fig. 2; the other two hooks may be rigid and fixed to the same inner face of the tire seat 1, with their similarly curved goose neck and bill portions extending to one side for engagement with the adjacent edge of the tire seat A. For very evident reasons of adjustment, each one of the fixed hook members must be diametrically opposite one of the adjustable hooks, or at least the fixed hooks must not be diametrically opposite to one another. On the inner face of the auxiliary tire seat 1 are bolted or secured bearing lugs 4 and 5, in which is journaled a cam 6 adapted to engage closely against the body part of the hook 11, that is placed between the inner face of the tire seat and the cam. The hook 11, which engages so loosely between the cam 6 and the opposite face of the auxiliary tire seat 1, that, by careful handling, it can be removed from such position, has passing through its angular rear terminal (at the opposite end from the goose neck 12), the set screw 9, which, after the cam 6 has been actuated, so as to press the body part of the hook 11 closely against the auxiliary tire seat, engages against a slightly recessed portion of the cam member which is, by its movement to this position, brought in axial alinement with the set screw, and when thus adjusted thereagainst, the set screw prevents the return of the cam to its "open" position, which would permit of the moving of the hook 11, above referred to. The screw 9 thus holds the cam in position after it has been forced to position, and produces a strong and firm support for the auxiliary tire seat 1 on which the vehicle may be carried with safety, as upon the ordinary wheel. Two of the hooks 11 are preferably used to co-act with cams to secure the auxiliary tire seat in place, and two hooks without cams, the four being sufficient under ordinary circumstances to hold the auxiliary tire seat in place.

What I claim is:—

1. As a means for securing an auxiliary or spare wheel to a vehicle wheel, in combination with the rim of the spare wheel, a pair of abutments fixed thereto, a clamp member having a hooked terminal, adapted to engage over the edge of the main wheel rim, engaging with its body portion against that portion of the rim of the spare wheel intermediate said abutments, an eccentric member pivotally supported between said abutments and adapted to be forced into engagement with said hook member and to thereby hold it firmly against said wheel rim, and an adjusting screw engaging through a portion of said clamp member and against said eccentric member, whereby the latter may be firmly held in position against said clamp member, substantially as described.

2. In combination with the rim of a spare wheel, a cam member pivotally supported thereby, a loose hook adapted to engage between the cam and the rim, said hook being provided with a terminal bill for engaging the rim of the main wheel, its body portion being adapted to be forced by said cam firmly against the adjacent face of the spare wheel rim and to thereby press its terminal bill against the inner face of the rim of the main wheel, and a screw passing through the opposite end of the hook member from the terminal bill and engaging against the cam member, whereby it is held from unintended release from its clamping position, substantially as described.

In testimony whereof, I sign this specification in the presence of two witnesses.

BENJAMIN B. BRADLEY.

Witnesses:
CHARLES F. BURTON,
ELLIOTT J. STODDARD.